US006633479B2

(12) United States Patent
Benson

(10) Patent No.: US 6,633,479 B2
(45) Date of Patent: Oct. 14, 2003

(54) PORTABLE, TEMPORARY POWER HOOKUP FOR USE AT CONSTRUCTION SITES, SYSTEMS INCLUDING THE SAME, AND METHODS

(75) Inventor: Robert Karl Benson, Orem, UT (US)

(73) Assignee: Robert Karl Benson, Inc., Orem, UT (US)

(*) Notice: Subject to any disclaimer, the term of this patent is extended or adjusted under 35 U.S.C. 154(b) by 1 day.

(21) Appl. No.: 09/892,088

(22) Filed: Jun. 26, 2001

(65) Prior Publication Data

US 2002/0030963 A1 Mar. 14, 2002

Related U.S. Application Data

(63) Continuation-in-part of application No. 09/460,046, filed on Dec. 13, 1999, now Pat. No. 6,252,764.

(51) Int. Cl.[7] .................................................. H01B 7/06
(52) U.S. Cl. ........................ 361/625; 361/601; 361/641; 174/37; 174/69
(58) Field of Search ................................. 361/601, 605, 361/606, 602–603, 611–631, 634, 641, 643, 652, 663, 672, 658–660; 174/37–38, 52.1, 45 R, 69; 307/112, 147, 113, 47, 150; 312/351.11, 351.12, 351.13; 200/51 R; 324/110, 156; 434/365, 379; 248/27.1, 129

(56) References Cited

U.S. PATENT DOCUMENTS

| | | | |
|---|---|---|---|
| 3,158,679 A | | 11/1964 | Ware |
| 3,631,324 A | | 12/1971 | Jones |
| 3,786,312 A | * | 1/1974 | Roussard .................. 361/643 |
| 4,084,203 A | * | 4/1978 | Dietz et al. ................... 361/45 |
| 4,318,156 A | * | 3/1982 | Gallagher .................. 361/647 |
| 4,717,108 A | | 1/1988 | Liedle |
| 4,888,448 A | | 12/1989 | Moerman |
| 5,400,212 A | | 3/1995 | Hanson |
| 5,404,266 A | | 4/1995 | Orchard et al. |
| 5,418,683 A | | 5/1995 | Orchard et al. |
| 5,544,003 A | | 8/1996 | Vaughan |
| 5,574,622 A | | 11/1996 | Brown |
| 5,726,507 A | | 3/1998 | Tipton |
| 5,838,078 A | | 11/1998 | Tipton |
| 5,973,264 A | | 10/1999 | O'Connor |
| 6,404,620 B1 | * | 6/2002 | Piccione .................. 361/601 |

* cited by examiner

Primary Examiner—Michael Datskovsky
(74) Attorney, Agent, or Firm—TraskBritt

(57) ABSTRACT

A portable, reusable apparatus for providing temporary electrical service is disclosed. The apparatus includes a support structure with at least one service line, a meter base, and a breaker box secured thereto. One or more electrical receptacles may also be secured to the support structure. The apparatus may be configured to alternately connect to overhead and underground power supplies. A remote power supply apparatus is also disclosed. The remote power supply apparatus includes an electrical cord that is connectable to temporary electrical service. Systems that include these apparatus and methods of using the apparatus are also disclosed.

15 Claims, 10 Drawing Sheets

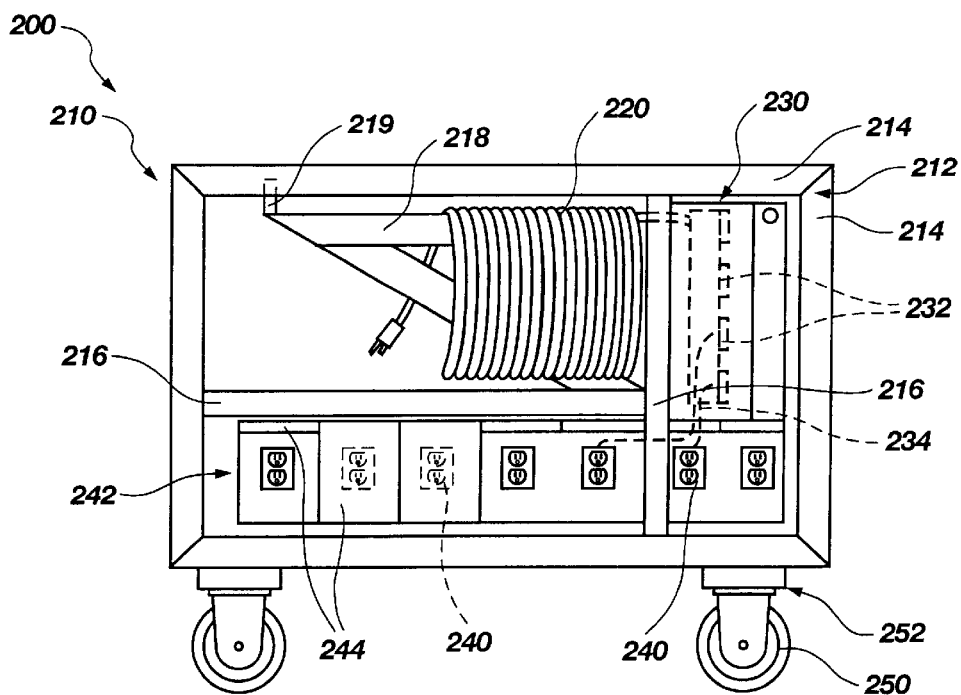
Fig. 11
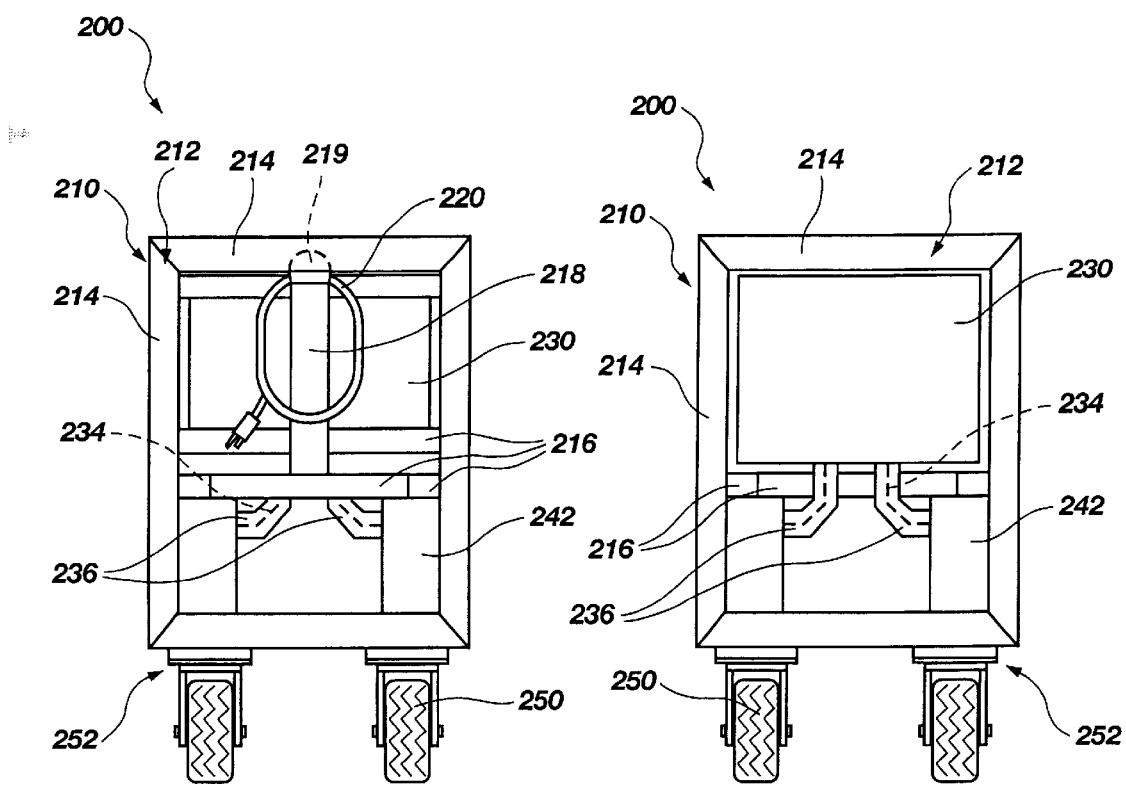
Fig. 12
Fig. 13

PORTABLE, TEMPORARY POWER HOOKUP FOR USE AT CONSTRUCTION SITES, SYSTEMS INCLUDING THE SAME, AND METHODS

CROSS REFERENCE TO RELATED APPLICATIONS

This application is a continuation-in-part of application Ser. No. 09/460,046, filed Dec. 13, 1999, now U.S. Pat. No. 6,252,764, issued Jun. 26, 2001.

BACKGROUND OF THE INVENTION

1. Field of the Invention

The present invention relates generally to apparatus that are used to provide temporary electrical power to construction sites. Particularly, the present invention relates to a portable apparatus for providing temporary electrical power to a construction site. The present invention also relates to methods of providing temporary electrical power to construction sites by using the apparatus.

2. State of the Art

A temporary source of electricity is typically needed at a construction site to power electrical tools, lighting, and other equipment that may be used at the construction site. Temporary power is often provided to a construction site by way of a temporary connection to either an overhead or underground power supply.

When electricity is provided to a construction site by way of a temporary connection to an overhead power supply, an electrician typically has to dig a hole and set a cumbersome temporary service pole close to a transformer associated with the overhead power lines. Digging the hole and securing, or setting, the temporary service pole therein is often a labor-intensive, time-consuming task, as the hole must be deep enough to secure the typically tall, temporary service pole for the entire duration of construction at the site.

Typically, a temporary service pole has a conduit along at least a portion of the length thereof. Service wires extend from the top of the temporary service pole, through the conduit, to a location along the length of the temporary service pole where a meter base, which measures the amount of electricity used at the construction site, is to be secured. Thus, the conduit of the temporary service pole encloses the electrical wires to protect and prevent tampering with the service line.

The electrician connects the ends of the wires of the service line that are exposed along the length of the temporary service pole to a meter base. The meter base is electrically connected to a breaker box to which one or two electrical receptacles that are protected by a ground fault circuit interrupter (GFCI) are typically electrically connected. The meter base, breaker box, and conduits are then secured to the temporary service pole. Once the temporary service pole is in place, the local inspection authority will inspect the pole and the wiring between each of the foregoing components. The power company then connects the other end of the wires of the temporary service line to the nearby overhead power supply.

A temporary hookup can be made to underground power lines in a similar manner. If a temporary service pole is used to provide power to a construction site from an underground power supply, however, the wires of the service line extend through the pole to a location proximate the bottom end thereof to facilitate connection with the underground power lines. Alternatively, as long as the service line is somehow enclosed and protected, the service pole can be omitted and the temporary service line connected directly to a stable, stationary meter base.

Since it typically takes several months to complete the construction of a structure, electricians typically include the costs of temporary electrical service components in their fee for setting up the temporary electrical connection. Moreover, the components of a temporary electrical connection, including the service line, the meter base, and the breaker box, can be exposed to a variety of weather conditions, as well as construction conditions that may damage these temporary electrical service components. If the components of the temporary electrical connection are to be reused, once construction has been completed the components must be disassembled from one another and the temporary service pole removed from the ground. These components, including the cumbersome temporary service pole, are then typically loaded onto or in a trailer and transported to another construction site or stored for later use. Electricians sometimes abandon the components of a temporary electrical connection.

Once temporary electrical service has been provided to a site, long extension cords are typically required to convey power from the fixed location at which the temporary electrical service is provided to locations of the site that are remote from the location of the temporary electrical service. When multiple extension cords are hooked up to temporary electrical service, these cords may become entangled with one another or present workplace tripping hazards that are equal in number to the number of cords that extend across a portion of a work site.

Accordingly, there is a need for an apparatus by which temporary electrical service can be provided without requiring an electrician to dig a hole, to set a temporary service pole in the hole, to electrically connect a meter base to one end of a service line, and to electrically connect a breaker box to the meter base. There are also needs for an apparatus that enables an electrician to reuse the components of a temporary electrical connection without removing a temporary service pole from the ground or requiring the disassembly of each of the components, for a temporary electrical service apparatus that can be more easily moved from one construction site to another, and for an apparatus that can be used, without significant modification, to provide temporary electrical service from either overhead or underground power lines. In addition, there is a need for a system by which electricity may be distributed at locations remote from such a temporary electrical service apparatus.

SUMMARY OF THE INVENTION

The present invention includes an apparatus for providing temporary electrical service, for example, at a construction site. The apparatus of the invention includes a support structure having an enclosed service line, a meter base, a breaker box, and electrical receptacles. The service line is prewired to the meter base, which is prewired to the breaker box. Electrical receptacles that are protected by a ground fault circuit interrupter (GFCI) are electrically connected to the breaker box.

According to a first aspect of the invention, the apparatus has a portable support structure, such as the bed of a trailer. Thus, the apparatus has wheels to facilitate the ready transport thereof from one construction site to another construction site or to a storage location. A portion of the service line extends through an enclosure of the support structure, such as a conduit through or secured to the trailer. One end of the service line is exposed for connection to a power supply. The other, enclosed end of the service line communicates electrically with the meter base, which is secured to the trailer. The meter base, in turn, communicates electrically with the breaker box, which is also secured to the trailer. In addition, electrical receptacles may be secured to the trailer.

In another aspect of the present invention, the apparatus may be used to provide temporary electrical service from either an overhead power supply or an underground power supply.

Such an apparatus has secured to the support structure a service pole configured to facilitate the connection of a first service line to an overhead power supply. Preferably, the service pole is pivotally secured to the support structure so as to be movable between a lowered, transport position and an upwardly extending electrical service position. Preferably, the service pole may be secured in the electrical service position. An end of a first line is exposed proximate a top end of the service pole to facilitate connection of the first service line to an overhead power supply. The first service line extends through and is enclosed within the service pole and through an enclosure of the support structure to a transfer switch secured to the support structure.

The apparatus also includes a second service line. A first end of the second service line is configured to be connected with an underground power supply. The second service line extends through an enclosure of or is carried by the support structure to the transfer switch.

The transfer switch has three positions: a first position that permits the transfer of electricity from the first service line therethrough; a second position that permits electricity from the second service line to flow therethrough; and a third position in which both service lines are open and no electricity passes through the transfer switch. Depending upon the position of the transfer switch, electricity from one of the first and second service lines may flow to the meter base through a transfer line connected between the transfer switch and the meter base. Electricity then flows to the breaker box, which is connected to the meter base, and may be used by way of receptacles that are in electrical communication with the breaker box. Moreover, as the first and second service lines are connected to the transfer switch in such a manner that electricity from only one of the service lines flows through the switch, the first and second service lines remain electrically isolated from each other. Therefore, when one of the first and second transfer lines is connected to a power supply, electricity will not flow to the exposed end of the other transfer line (i.e., the exposed end of the other transfer line will not be live).

The present invention also includes apparatus that provide electrical service at locations that are remote from the fixed locations at which temporary electrical service is provided. These remote electrical service apparatus may be portable to facilitate movement thereof to various locations.

An exemplary remote electrical service apparatus incorporating teachings of the present invention includes a frame which carries an electrical cord for establishing communication between a temporary electrical service apparatus, such as that disclosed herein, at a relatively fixed location and the electrical components of the remote electrical service apparatus. The electrical cord may communicate with a breaker box which includes one or more breakers that, in turn, communicate with one or more receptacles. Alternatively, the electrical cord may communicate directly with one receptacle, or with a number of different receptacles by way of branches therefrom.

The remote electrical service apparatus may also include a storage component for stowing all or portions of the electrical cord. For example, when the remote electrical service apparatus is in use, a portion of the length of the electrical cord that is not needed to establish an electrical connection between the remote electrical service apparatus and a fixed temporary electrical service location may be stowed by the storage component. When the remote electrical service apparatus is not being used, the entire electrical cord may be received by the storage component.

Wheels may be used to impart portability to remote electrical service apparatus of the present invention.

The present invention also includes methods using the apparatus to provide temporary electrical service from either an overhead power supply or an underground power supply, as well as methods for disconnecting the apparatus from a power supply and transporting the apparatus to another location for reuse or storage. In addition, the present invention includes systems and methods for distributing electricity from the location of the apparatus to other locations of the site that are remote from the apparatus.

Other features and advantages of the present invention will become apparent to those in the art through consideration of the ensuing description, the accompanying drawings, and the appended claims.

BRIEF DESCRIPTION OF THE DRAWINGS

In the drawings, which illustrate exemplary embodiments of various aspects of the present invention:

FIG. 11 is a side view of a remote electrical service apparatus incorporating teachings of the present invention;

FIG. 12 is a front view of the remote electrical service apparatus shown in FIG. 11;

FIG. 13 is a rear view of the remote electrical service apparatus shown in FIGS. 11 and 12.

DETAILED DESCRIPTION OF THE PREFERRED EMBODIMENTS

Figure 1:
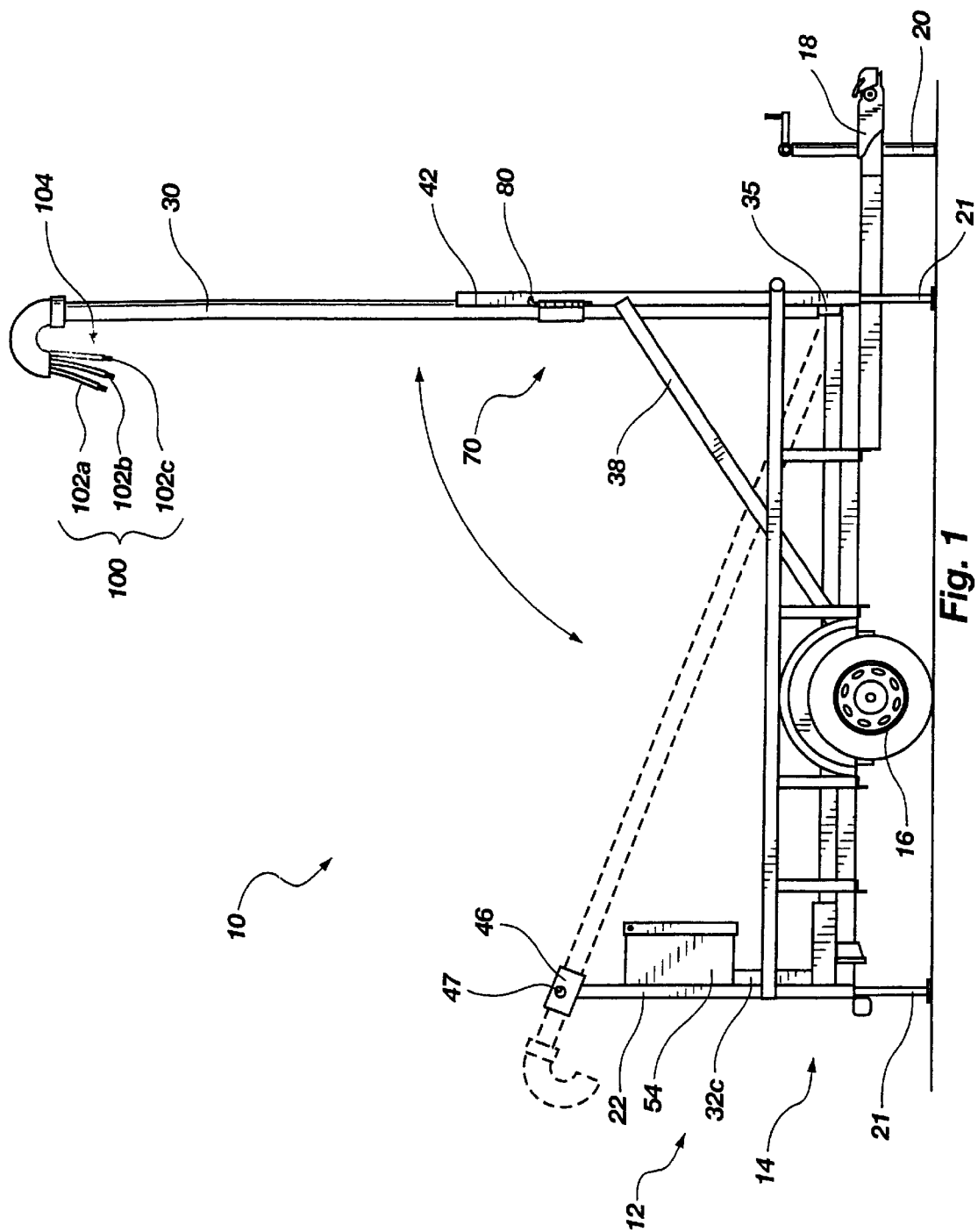
FIG. 1 is a side view of an apparatus according to the present invention for providing temporary electrical service.

FIGS. 1–4 illustrate an apparatus 10, also referred to herein as a temporary electrical service apparatus, which can provide temporary electrical service, for example, to a construction site. As shown in FIG. 1, apparatus 10 includes a trailer 12 with a bed 14, wheels 16 secured at sides of bed 14, a trailer hitch 18 extending from the front of bed 14, and a trailer support 20 secured to trailer hitch 18 and downwardly extendable therefrom. Wheels 16 and trailer hitch 18 facilitate the transportation of apparatus 10 and, thus, of all of the electrical componentry secured to bed 14. Trailer support 20 is configured to support bed 14 in a substantially horizontal position during use or storage of apparatus 10. Trailer 12 may also have additional stabilizer feet 21 located at or near the corners of bed 14. When placed in a lowered position or otherwise secured to bed 14, stabilizer feet 21 provide further support to maintain the horizontal position of bed 14.

Trailer 12 also has a vertically oriented panel 22 located at the back of bed 14 and configured to support various electrical components that are needed to establish temporary electrical service. Each of the electrical components of apparatus 10 is either secured to bed 14 or to panel 22.

In order to provide temporary electrical service, apparatus 10 has a first service line 100, including at least three wires 102a, 102b, 102c for connection to an overhead power supply and a second service line 110, including at least three wires 112a, 112b, 112c for connection to an underground power supply.

First service line 100 extends through a temporary service pole 30, a 90° joint 35 and a coupling 36 connecting pole 30 to bed 14, a first conduit 32a, a junction box 33, and a common conduit 32c to a transfer switch 34 mounted to an inner surface 24 of panel 22 so as to be located within trailer 12, over bed 14. Coupling 36, first conduit 32a, and junction box 33 are each carried by bed 14. A horizontal portion of common conduit 32c is carried by bed 14, while a vertical portion of common conduit 32c is carried by panel 22. Preferably, the entire length of first service line 100, with the exception of end 104, is enclosed and thereby protected.

As illustrated, service pole 30 is a hollow, cylindrical member having a conduit (not illustrated) within which a portion of the length of first service line 100 is enclosed. Service pole 30 is secured to bed 14 by way of joint 35, coupling 36 and conduit straps 37 that secure conduits 32a, 32b, and 32c to bed 14 and to panel 22. Joint 35 and coupling 36 have internal chambers (not illustrated) that are configured to communicate with the conduit of service pole 30 and with conduit 32a or another enclosure carried by or located within bed 14 so as to prevent exposure of any portion of the length of first service line 100 without pinching service line 100 or wearing the insulative sheaths of any of wires 102a–102c.

Joint 35 and coupling 36, which are illustrated as being located at a front corner of bed 14, facilitate pivotal movement of service pole 30 between a first, upright position and a second, lowered position, shown in phantom. For example, joint 35 and coupling 36 may be secured together by way of complementary threading. Such threading facilitates rotational movement of joint 35 relative to coupling 36 and, thus, facilitates pivotal movement of service pole 30 relative to bed 14 while keeping first service line 100 enclosed. Service pole 30 is placed and secured in the upright position so as to position end 104 of first service line 100 proximate an overhead power supply when apparatus 10 is used to provide temporary electrical service from the overhead power supply. Service pole 30 may be placed in the lowered position during storage or transport of apparatus 10, or when apparatus 10 is used to provide temporary electrical service from an underground power supply.

When placed in the upright position, service pole 30 is also supported by an upwardly extending service pole brace 42, which is depicted as being located at a front end of bed 14. Brace 42 is secured in the upright position by way of one or more support arms 38 that are each secured to brace 42 at one end and to bed 14 at the other end.

Figure 10:
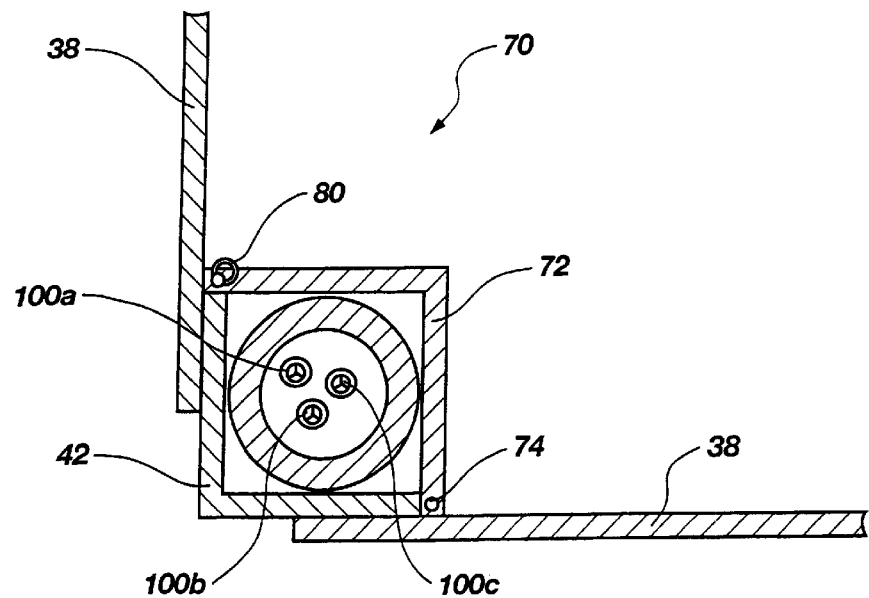
FIG. 10 is a cross-section taken along line 10—10 of FIG. 9.
Figure 9:
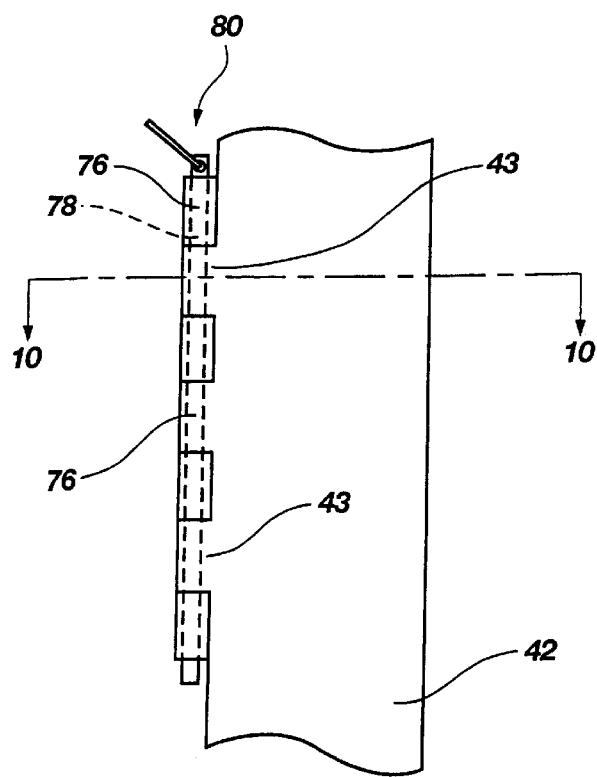
FIG. 9 is a side view of a lock for securing a service pole of the apparatus depicted in FIGS. 1–4 in an upright position.

Service pole brace 42 has an elongate receptacle 44 configured to receive at least a portion of the length of service pole 30. A lock 70 and pin 80 are positioned along brace 42 so as to secure service pole 30 in the upright position. An exemplary lock 70 and pin 80 are illustrated in FIGS. 9 and 10. Lock 70 includes a securing arm 72, which has an L-shaped cross-section taken transverse to the length thereof. One edge of securing arm 72 is attached to brace 42 by way of a hinge 74. The other edge of securing arm 72 has a tongue and groove configuration, each of the tongues 76 having an elongate hole 78 formed through the length thereof, the elongate holes 78 of tongues 76 being located along a single line. When securing arm 72 is placed in a closed position, tongues 76 thereof are configured to be received between complementarily configured tongues 43 protruding from an edge of brace 42. Each of tongues 43 also has an elongate hole 78 formed through the length thereof, the elongate holes 78 of both tongues 76 and of tongues 43 being substantially in-line when securing arm 72 is placed in the closed position. Accordingly, a pin 80, such as a cotter pin, may be inserted into holes 78 to secure arm 72 in the closed position and, thus, to secure service pole 30 in the upright position.

When service pole 30 is placed in the lowered position, service pole 30 is received by and rests in a cradle 46 disposed on the top of panel 22. As illustrated, a pin 47, such as a cotter pin, may be placed through holes (not shown) formed through opposite arms of cradle 46 and over a service pole 30 resting therein so as to secure service pole 30 in the lowered position thereof.

Second service line 110 extends through a second conduit 32b, junction box 33, and common conduit 32c to transfer switch 34. Second conduit 32b, which is carried by bed 14, has a downwardly extending end 31 from which end 114 of second service line 110 extends. End 31 of second conduit 32b positions end 114 of second service line 110 near the ground. With the exception of end 114, the entire length of second service line 110 is preferably enclosed and thereby protected.

Figure 4:
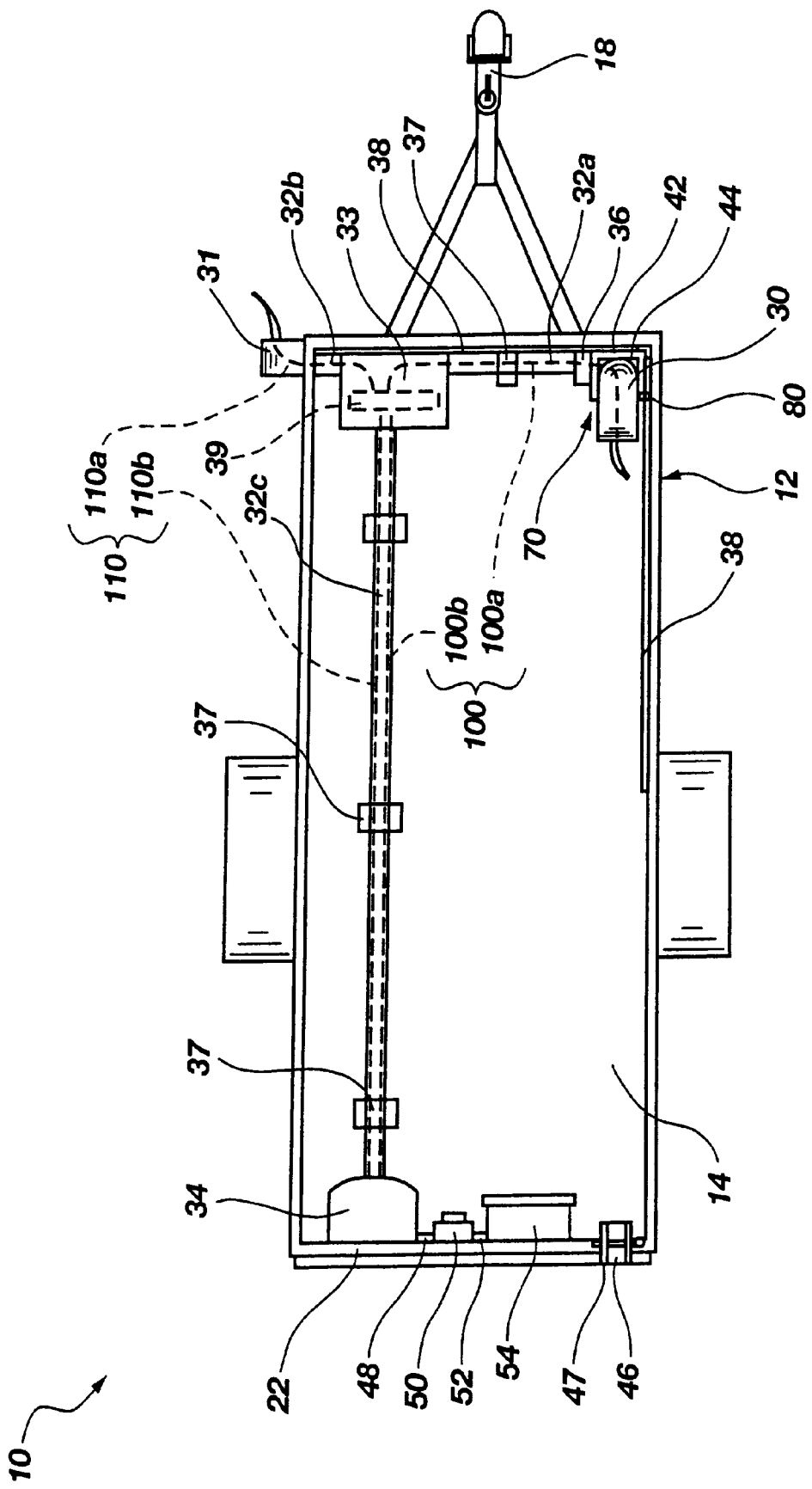
FIG. 4 is a top view of the apparatus depicted in FIG. 1.

Once a temporary electrical connection is no longer needed, first or second service line 100, 110 is typically cut and, thus, shortened. Eventually, one or both of first and second service lines 100, 110 become too short to provide the desired temporary electrical connection and must, therefore, be replaced with longer lines. Accordingly, as shown in FIG. 4, first and second service lines 100, 110 may each have two sections, a temporary section 100a, 110a that connects to an external power supply and a permanent section 110b, 110b that extends between junction box 33 and the next electrical component of apparatus 10 (e.g., transfer switch 34 or meter base 50). The two sections 100a and 110b, 110a and 110b of each of first and second service lines 100, 110, respectively, are connected by way of electrical terminals 39 of a known type located within junction box 33. Terminals 39 eliminate the need to completely re-thread new service lines 100, 110 through their respective conduits to the first electrical component of apparatus 10 (e.g., transfer switch 34 or meter base 50) for connection therewith. When apparatus 10 includes a terminal 39 in junction box 33, new sections 100a, 110a of service lines 100, 110 need only be threaded through a portion of their respective conduits into junction box 33, where the new sections are connected to terminals 39 and, thus, to their corresponding permanent sections 110b, 110b.

Figure 6:
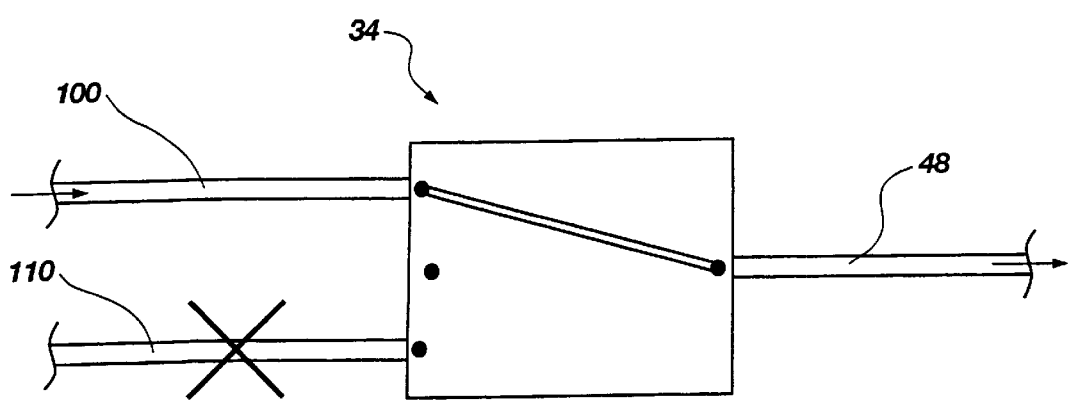
FIG. 6 is a schematic representation of the flow of power through the apparatus of the present invention with a transfer switch thereof in a first "on" position.
Figure 7:
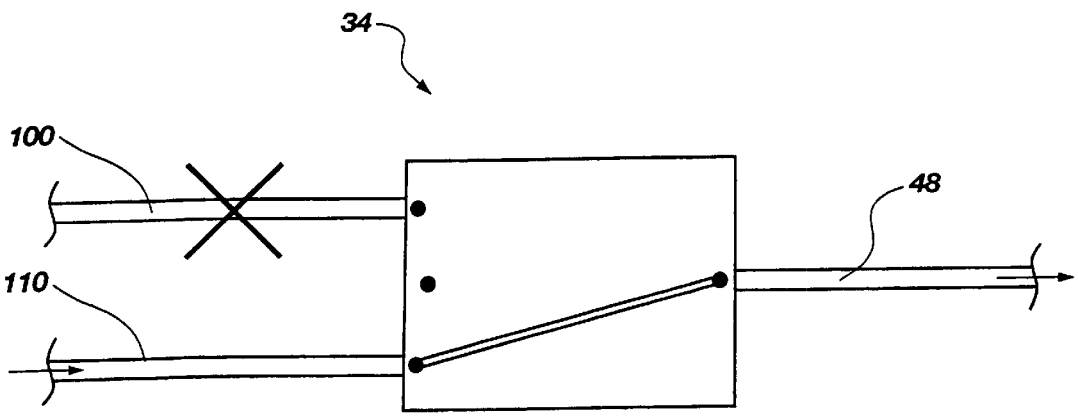
FIG. 7 is a schematic representation of the flow of power through the apparatus of the present invention with a transfer switch thereof in a second "on" position.
Figure 8:
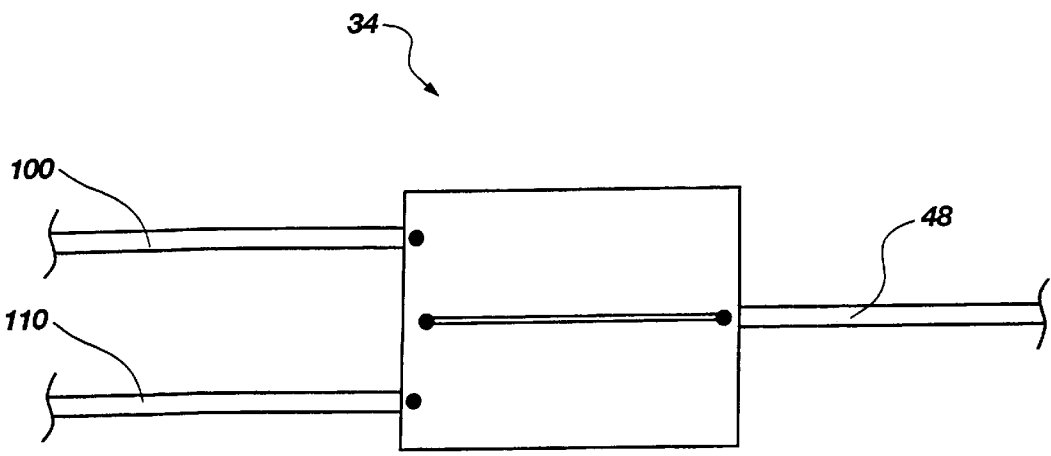
FIG. 8 is a schematic representation of the transfer switch of the apparatus of the present invention in an "off" position.

As schematically depicted in FIGS. 6–8, transfer switch 34 has three positions, two "on" positions, illustrated in FIGS. 6 and 7, and an "off" position depicted in FIG. 8. For example, the double throw safety switch marketed by Square D of Palatine, Ill. as catalog numbers 82343 and 82363, which may be used with alternating current (AC) power supplies having voltages of up to 600V, may be used as transfer switch 34.

With reference to FIGS. 6 and 7, the two "on" positions of transfer switch 34 permit power from only one of first service line 100 and second service line 110 to pass therethrough, while keeping first and second service lines 100 and 110, respectively, electrically isolated from each other. Accordingly, if one of first and second service lines 100, 110 is connected to a power supply, power will not flow from the connected service line into the unconnected service line. A double throw safety switch of a type known in the art may be used as transfer switch 34.

When transfer switch 34 is in the "off" position, as is schematically depicted in FIG. 8, electricity from both first service line 100 and second service line 110 is prevented from passing therethrough. First and second service lines 100, 110 remain electrically isolated from one another when transfer switch 34 is in the "off" position.

Turning back to FIG. 2, power flows from transfer switch 34 through wires (not shown), also referred to herein as a transfer line, disposed within a conduit 48 to a meter base 50. Conduit 48 and meter base 50 are carried by panel 22. A meter base 50 that is useful in apparatus 10 may be any type of meter base known in the art to be designed for use with the particular power supply from which temporary service is to be provided by apparatus 10. Exemplary meter bases that may be used in apparatus 10 are available from Milbank Manufacturing Company of Kansas City, Mo. When temporary service is being provided from 120/240V (i.e., residential) power lines, meter base 50 is preferably rated for about 125–150 A.

Power then flows through another set of wires disposed within another conduit 52 to a breaker box 54. Conduit 52 and breaker box 54 are also carried by panel 22. Breakers (not shown) that are useful in breaker box 54 may also be any type of breakers known in the art. For example, the breakers and breaker box that are available from Square D may be used in apparatus 10. Again, the breakers should be rated for use with the particular power supply from which temporary service is to be provided by apparatus 10 (i.e., 120/240V or 480V).

Figure 3:
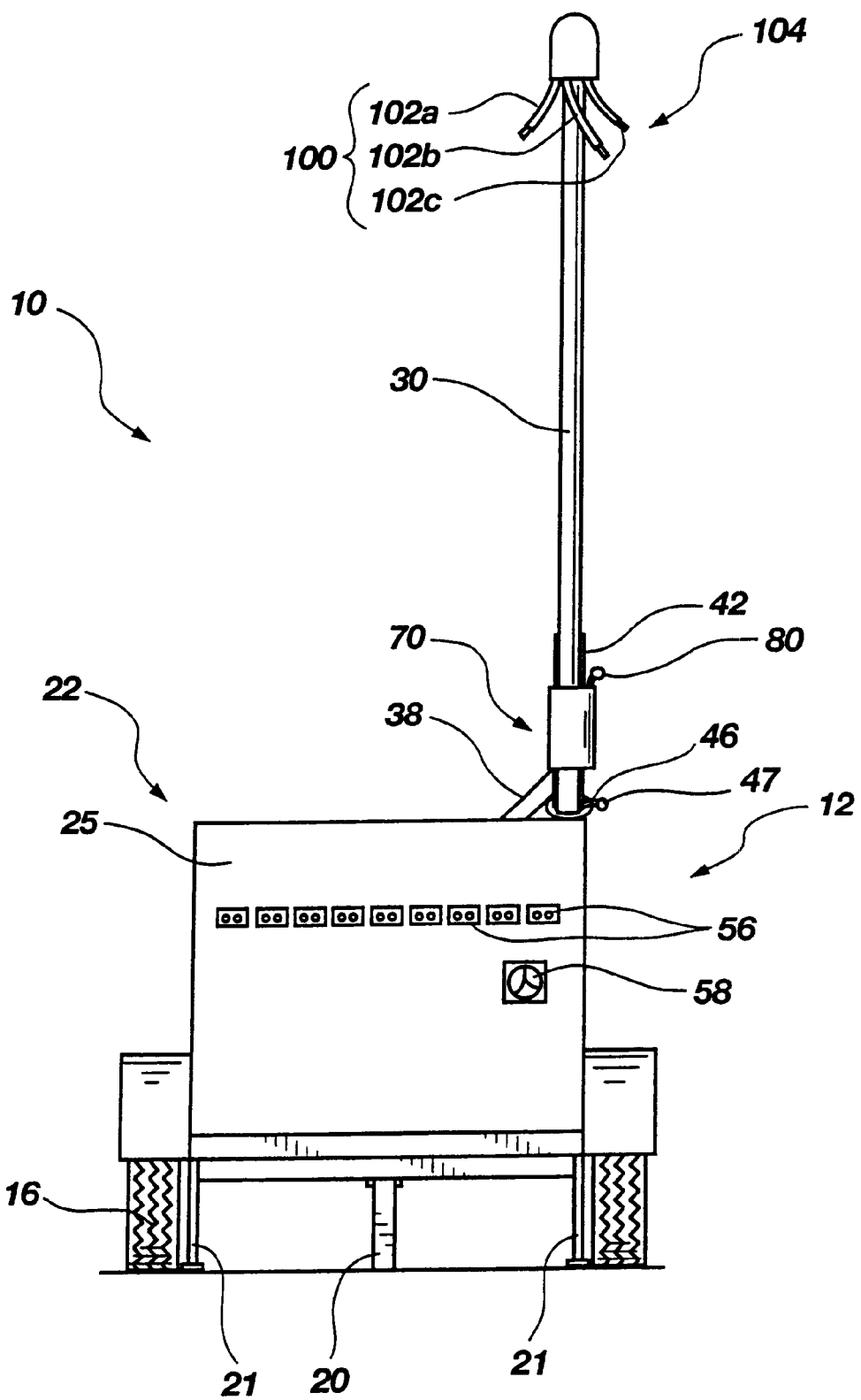
FIG. 3 is a rear view of the apparatus depicted in FIG. 1.

Referring now specifically to FIG. 3, wires disposed within panel 22 connect the breakers of breaker box 54 to electrical receptacles 56, 58 mounted on the back surface 25 of panel 22. Receptacles 56 are GFCI protected electrical receptacles of a type known in the art, through which power having a voltage of 120V ac is supplied. Receptacle 58 is preferably a 240V electrical receptacle, also of a type known in the art.

Figure 5:
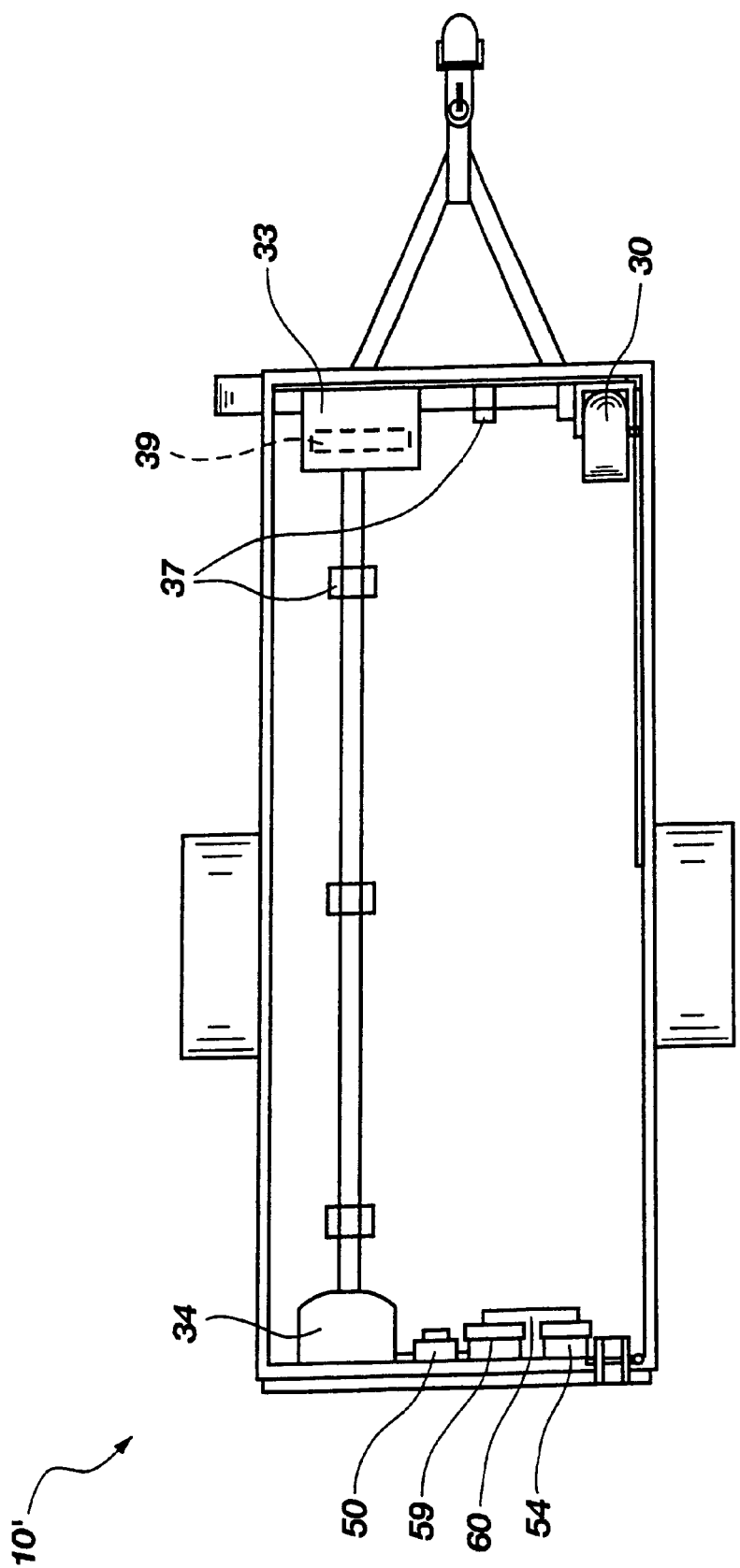
FIG. 5 is a top view of another apparatus according to the present invention.
Figure 5A:
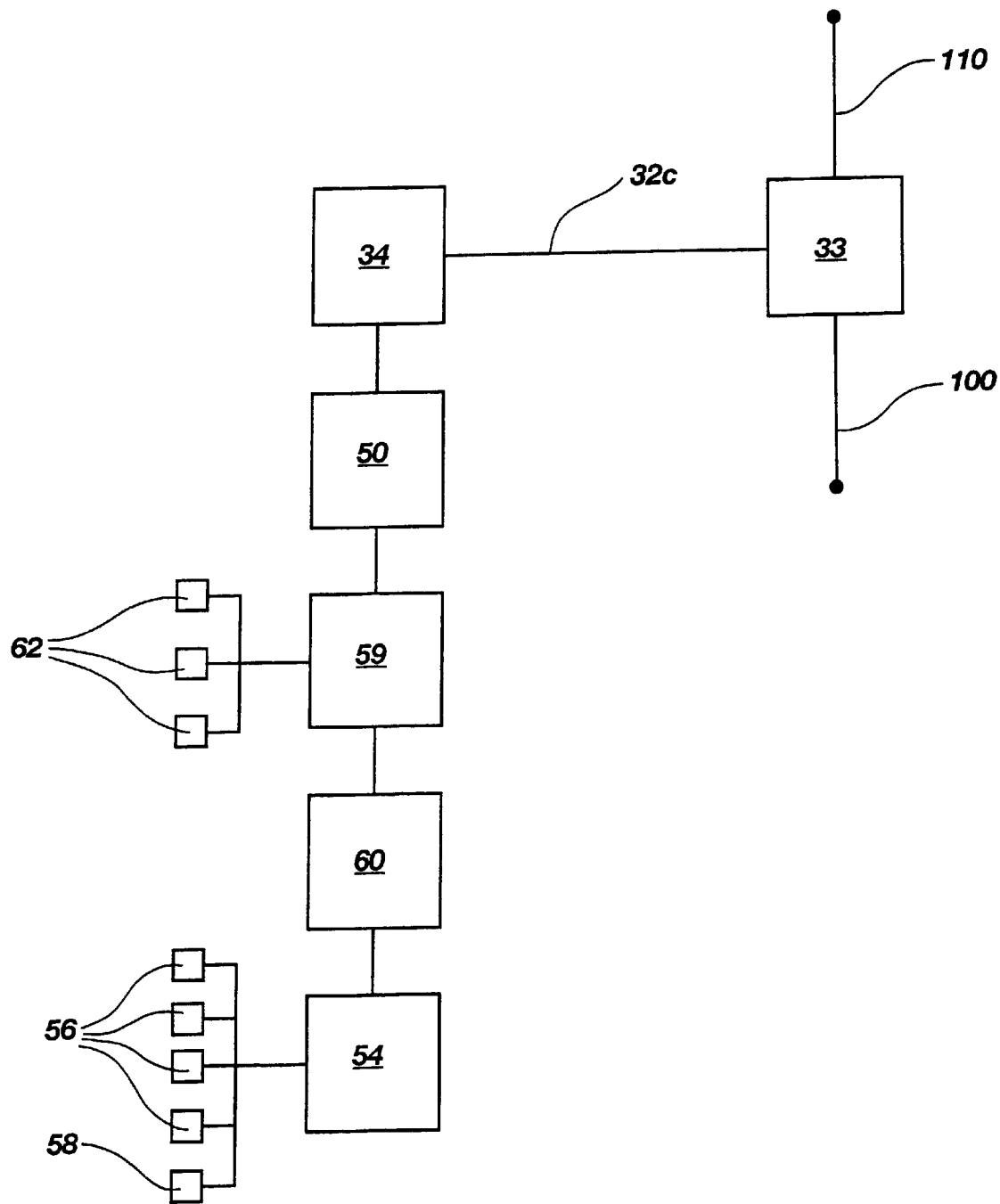
FIG. 5A is a schematic representation of the connection of the electrical components of the apparatus depicted in FIG. 5.

FIGS. 5 and 5A illustrate another embodiment of an apparatus 10' incorporating teachings of the present invention. Apparatus 10', which includes another breaker box 59 and a transformer 60 that are connected between meter base 50 and breaker box 54, is configured to provide temporary electrical service from a 480V power supply. Apparatus 10' may also include 480V electrical receptacles 62 associated with breaker box 59. Accordingly, meter base 50 is rated for a much higher current (e.g., about 208–240 A) than the minimum 125–150A rating required in apparatus 10. Similarly, breaker box 59 is rated for a much higher current (e.g., about 208–240A) than breaker box 54. Transformer 60, which is of a type known and used in the art, transforms the high voltage and current supplied by the power lines to a voltage (e.g., 120/240V) and current that may be used to operate electrical equipment, such as the equipment used at a construction site. The transformed electricity is then supplied to breaker box 54 and to the 120V and 240V electrical receptacles 56, 58, respectively, associated therewith.

Figure 2:
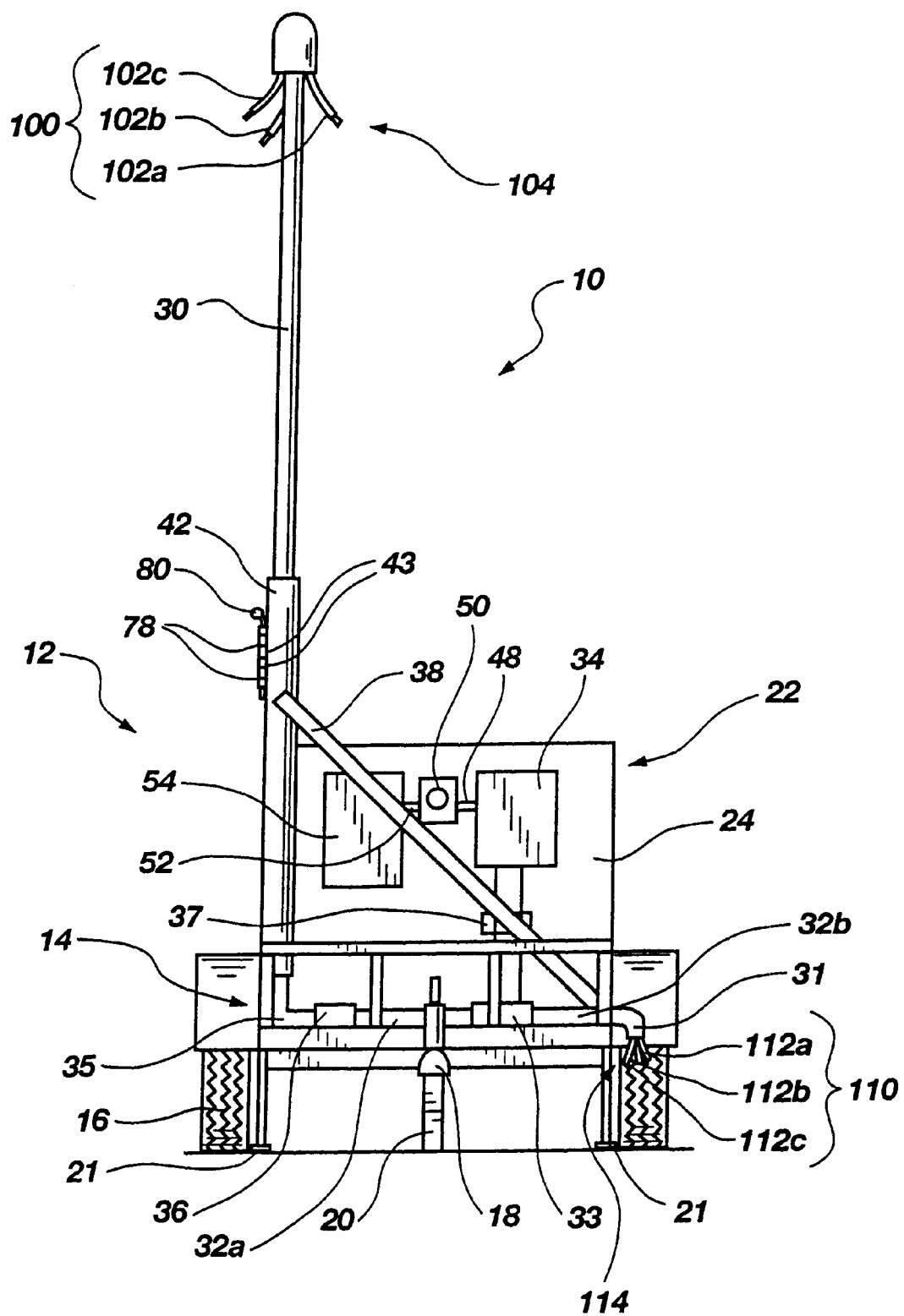
FIG. 2 is a front view of the apparatus depicted in FIG. 1.

In use, apparatus 10, 10' is transported to a site where temporary electrical service is needed. Trailer 12 is disconnected from a transporting vehicle and trailer support 20 lowered to stabilize bed 14 in a substantially horizontal position. Preferably, trailer 12 is secured in a stationary position, such as by placing blocks under wheels 16 to prevent movement of trailer 12 or by lower stabilizer feet 21. If the site is supplied with power by way of overhead power lines, temporary service pole 30 is placed and secured in the upright position, as illustrated in FIGS. 1–3, and first service line 100 connected to the overhead power supply. If the site is supplied with power by way of underground power lines, temporary service pole 30 is left in its lowered position, shown in phantom in FIG. 1, and second service line 110 is connected to the underground power supply. If apparatus 10, 10' has a transfer switch 34, transfer switch 34 is positioned so as to permit electricity to flow into meter base 50, breaker box 54, and electrical receptacles 56, 58.

When temporary electrical service is no longer needed, service line 100, 110 is disconnected from the power supply and, if temporary service pole 30 is secured in the upright position, temporary service pole 30 is lowered so as to rest in cradle 46. Apparatus 10, 10' may then be transported to storage or to another site for reuse.

Turning now to FIGS. 11–13, a remote electrical service apparatus 200 incorporating teachings of the present invention is illustrated. The depicted remote electrical service apparatus 200 includes a frame 210, an electrical cord 220, and receptacles 240 that are in electrical communication with electrical cord 220. Remote electrical service apparatus 200 may include a breaker box 230 positioned electrically in series between electrical cord 220 and receptacles 240. Also, one or more wheels 250 may be secured to frame 210 to facilitate movement of remote electrical service apparatus 200.

Frame 210 may be formed from metal, plastic, or any other suitable material. In addition to the material or materials from which frame 210 is formed, the size and structure of frame 210 are preferably suitable for carrying the various components of remote electrical service apparatus 200. In the depicted example, frame 210 includes an outer structure 212 including a series of interconnected elongate members 214 that are arranged in a cuboid, or parallelepiped, shape. Of course, remote electrical service apparatus 200 with frames of other shapes are also within the scope of the present invention.

The depicted frame 210 also includes cross members 216 that are secured to outer structure 212. Cross members 216 may impart additional structural support to frame 210 and, thus, to remote electrical service apparatus 200, support other components of remote electrical service apparatus 200, or a combination thereof.

A storage component 218 that receives electrical cord 220 may be secured to frame 210. Storage component 218 is depicted as a member around which a looped or wrapped electrical cord 220 may be hung. Storage component 218 includes an upwardly protruding retention member 219 that prevents a stowed cord from slipping off of an open end of storage component 218. Other types of storage components are also within the scope of the present invention, including, without limitation, apparatus that are capable of recoiling any loose portions of electrical cord 220 (e.g., slack, entire unconnected electrical cords, etc.), as well as structures that facilitate the wrapping of electrical cord 220 (e.g., a pair of hooks or hook-like members facing opposite directions), or that stow electrical cord 220 in a different manner than the illustrated storage component 218.

In the illustrated remote electrical service apparatus 200, a breaker box 230 is readily accessible, being positioned adjacent to an outer periphery of frame 210. Breaker box 230 is supported by and secured to some of cross members 216 of frame 210. One or more breakers 232 are carried within breaker box 230 and receive power by way of electrical cord 220. Breakers 232 that are useful in breaker box 230 may be any type of breakers known in the art. It is preferred that breakers 232 be rated for use with the particular amount of power supplied by the fixed temporary electrical service apparatus (e.g., 120V or 240V).

Electrical wires 234 that extend through conduits 236 electrically connect each breaker 232 within breaker box 230 to a corresponding receptacle 240. Each receptacle 240 may comprise an electrical receptacle of a known type that is suited for use with the voltage being supplied thereto (i.e., 120V ac or 240V ac). Receptacles 240 are preferably GFCI protected electrical receptacles of a type known in the art.

Receptacles 240 may be secured to frame 210 either directly or indirectly and positioned on one or more sides of remote electrical service apparatus 200. As depicted, receptacles 240 are positioned on opposite sides of remote electrical service apparatus 200 and are contained within weatherproof receptacle housings 242 which, in turn, are secured to frame 210. One or more covers 244 may be associated (e.g., by way of hinges) with each receptacle housing 242 to facilitate positioning of covers 244 over one or more receptacles 240 that are not in use.

As shown in FIGS. 11–13, remote electrical service apparatus 200 may include wheels 250 to facilitate movement thereof. Wheels 250 may be secured to frame 210 by way of hub assemblies 252 that extend downwardly frame 210. One or more of hub assemblies 252 may be rotatable or rotatably secured to frame 210 so as to facilitate turning of wheels 250 and, thus, of remote electrical service apparatus 200 during movement thereof.

Figure 14:
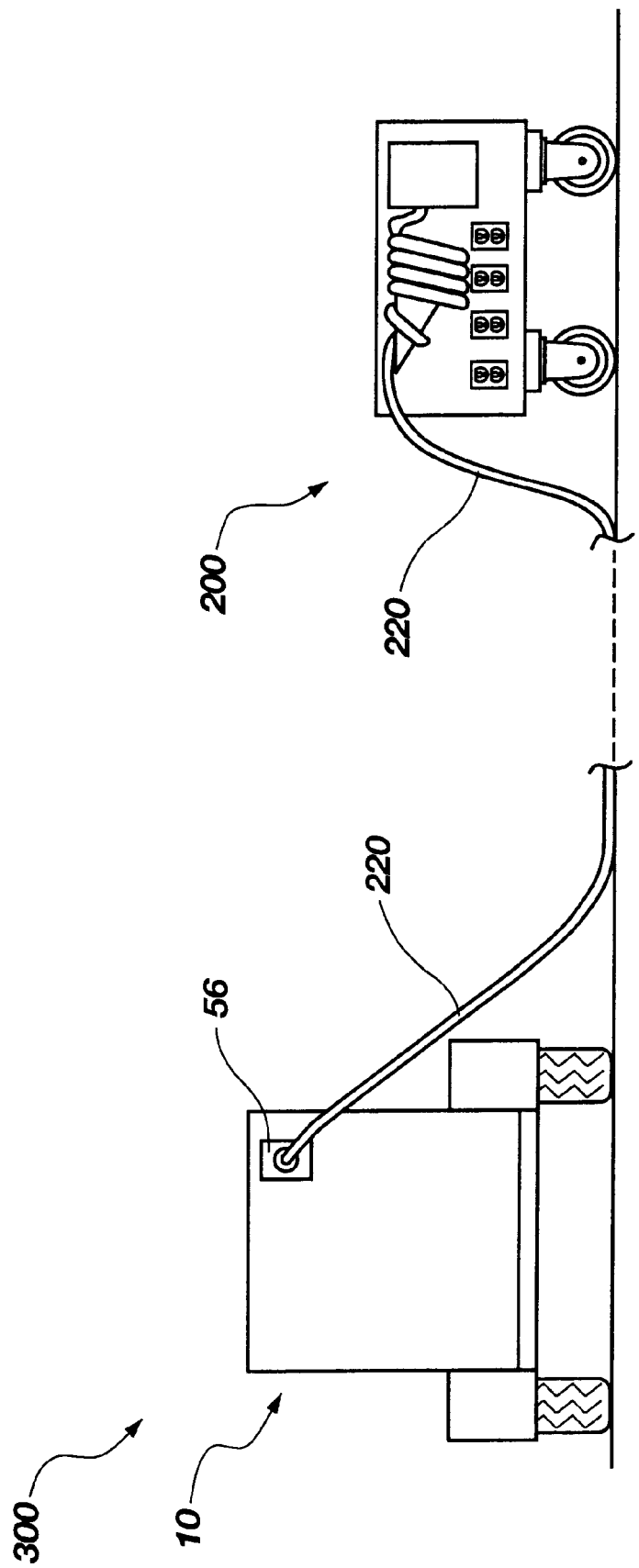
FIG. 14 is a schematic representation of a system including an apparatus of the type depicted in FIGS. 1–10 and a remote electrical service apparatus, such as that shown in FIGS. 11–13.

Turning now to FIG. 14, a system 300 is illustrated that provides temporary electrical service to a site by way of apparatus 10 and distributes electricity to a location remote from apparatus 10 by way of a remote electrical service apparatus 200. Remote electrical service apparatus 200 communicates with apparatus 10 by way of electrical cord 220, which extends from remote electrical service apparatus 200 and is electrically coupled to a receptacle 56 of apparatus 10. Remote electrical service apparatus 200 may be moved to a variety of different locations on a site to providing electricity at a location where it is needed.

While the present invention has been disclosed in terms of certain preferred embodiments, those of ordinary skill in the art will recognize and appreciate that the invention is not so limited. Additions, deletions and modifications to the disclosed embodiments may be effected without departing from the scope of the invention as claimed herein. Similarly, features from one embodiment may be combined with those of another while remaining within the scope of the invention.

What is claimed is:

1. A system for providing electrical service to a particular location, comprising:
   a temporary electrical service apparatus, comprising:
      a support structure;
      at least two service lines configured to be connected to a permanent power supply, at least a portion of a length of each service line located within an enclosure of said support structure; and
      at least one wheel secured to said support structure so as to facilitate transportation of said temporary electrical service apparatus; and
   at least one remote electrical service apparatus in electrical communication with one of said at least two service lines.

2. The system of claim 1, wherein said temporary electrical service apparatus further comprises a meter base in communication with at least one service line of said at least two service lines.

3. The system of claim 1, wherein a first service line of said at least two service lines is configured to be connected with an overhead power supply and a second service line of said at least two service lines is configured to be connected with an underground power supply.

4. The system of claim 1, wherein said at least one remote electrical service apparatus comprises at least one electrical receptacle.

5. The system of claim 4, wherein said at least one remote electrical service apparatus further comprises at least one breaker positioned electrically in series between said at least one electrical receptacle and said temporary electrical service apparatus.

6. The system of claim 4, wherein said at least one remote electrical service apparatus comprises an electrical cord that communicates with at least one service line of said temporary electrical service apparatus.

7. The system of claim 4, wherein said at least one electrical receptacle is housed within a weatherproof electrical housing.

8. The system of claim 4, wherein said at least one electrical receptacle comprises a ground fault circuit interrupter.

9. The system of claim 1, wherein said at least one remote electrical service apparatus comprises at least one wheel.

10. The system of claim 2, wherein said temporary electrical service apparatus further comprises a transfer switch electrically disposed between said meter base and said at least two service lines.

11. The system of claim 10, wherein said transfer switch is configured to permit power from only one of said at least two service lines to flow to said meter base.

12. The system of claim 10, wherein said at least two service lines are each electrically isolated from one another.

13. The system of claim 2, further comprising a breaker box in communication with said meter base.

14. The system of claim 13, further comprising a transformer disposed electrically between said meter base and said breaker box.

15. The system of claim 14, further comprising electrical receptacles in communication with one or more breakers of said breaker box.

\* \* \* \* \*

UNITED STATES PATENT AND TRADEMARK OFFICE
CERTIFICATE OF CORRECTION

PATENT NO. : 6,633,479 B2
DATED : October 14, 2003
INVENTOR(S) : Robert Karl Benson It is certified that error appears in the above-identified patent and that said Letters Patent is hereby corrected as shown below:

Column 6,
Lines 55 and 58, change first occurrence of "**110*b*" to -- 100*b*** --

Column 8,
Line 18, change "lower" to -- lowering --

Column 9,
Line 59, change "providing" to -- provide --

Signed and Sealed this

Twenty-sixth Day of July, 2005

JON W. DUDAS
*Director of the United States Patent and Trademark Office*